US009706810B2

(12) United States Patent
Follet et al.

(10) Patent No.: US 9,706,810 B2
(45) Date of Patent: *Jul. 18, 2017

(54) SPACER TEXTILE MATERIAL WITH CHANNELS HAVING MULTIPLE TENSILE STRANDS

(71) Applicant: NIKE, Inc., Beaverton, OR (US)

(72) Inventors: Lysandre Follet, Portland, OR (US); Douglas A. Beye, Beaverton, OR (US); Daniel A. Podhajny, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/965,310

(22) Filed: Dec. 10, 2015

(65) Prior Publication Data

US 2016/0095387 A1  Apr. 7, 2016

Related U.S. Application Data

(63) Continuation of application No. 13/741,440, filed on Jan. 15, 2013, now Pat. No. 9,226,548.

(51) Int. Cl.
*B32B 5/06* (2006.01)
*B32B 5/22* (2006.01)
(Continued)

(52) U.S. Cl.
CPC ............ *A43B 23/0205* (2013.01); *A43B 1/04* (2013.01); *A43B 23/024* (2013.01); *A43B 23/0245* (2013.01); *A43B 23/0265* (2013.01); *A43C 1/04* (2013.01); *B32B 3/08* (2013.01); *B32B 3/26* (2013.01); *B32B 3/28* (2013.01);
(Continued)

(58) Field of Classification Search
CPC .... B32B 5/06; B32B 5/10; B32B 5/22; A43B 31/04
USPC ....... 442/239, 240, 242–244, 246, 255, 305, 442/306, 312, 313, 314; 428/102, 103,
(Continued)

(56) References Cited

U.S. PATENT DOCUMENTS

| 4,333,978 | A | 6/1982 | Kocher |
| 4,705,586 | A | 11/1987 | Pouget et al. |

(Continued)

FOREIGN PATENT DOCUMENTS

| EP | 0212984 A2 | 3/1987 |
| EP | 0874076 A2 | 10/1998 |

(Continued)

OTHER PUBLICATIONS

International Preliminary Report on Patentability and Written Opinion for Application No. PCT/US2014/011386, issued on Jul. 21, 2015.

(Continued)

*Primary Examiner* — Jenna Johnson
(74) *Attorney, Agent, or Firm* — Klarquist Sparkman, LLP

(57) ABSTRACT

A spacer textile material having at least a portion of multiple tensile strands located together between a first layer and a second layer of the spacer textile material, where the first layer and second layer have been joined together to form channels in which the tensile strands move freely. The tensile strands may be disposed in the spacer textile material together or they may separate into different portions of the spacer textile. Further, the spacer textile material having channels with multiple tensile strands may be incorporated into an article of footwear.

23 Claims, 9 Drawing Sheets

(51) Int. Cl.
*A43B 1/04* (2006.01)
*A43B 23/02* (2006.01)
*B32B 23/00* (2006.01)
*D04B 21/20* (2006.01)
*B32B 5/26* (2006.01)
*B32B 3/26* (2006.01)
*A43C 1/04* (2006.01)
*B32B 3/08* (2006.01)
*B32B 3/28* (2006.01)
*B32B 7/04* (2006.01)
*D04C 1/12* (2006.01)

(52) U.S. Cl.
CPC ............... *B32B 5/06* (2013.01); *B32B 5/26* (2013.01); *B32B 7/045* (2013.01); *B32B 23/00* (2013.01); *D04B 21/20* (2013.01); *D04C 1/12* (2013.01); *B32B 2250/02* (2013.01); *B32B 2250/20* (2013.01); *B32B 2262/0238* (2013.01); *B32B 2262/0246* (2013.01); *B32B 2262/0261* (2013.01); *B32B 2262/0276* (2013.01); *B32B 2262/062* (2013.01); *B32B 2262/08* (2013.01); *B32B 2307/51* (2013.01); *B32B 2307/54* (2013.01); *B32B 2437/00* (2013.01); *B32B 2437/02* (2013.01); *B32B 2437/04* (2013.01); *D10B 2403/022* (2013.01); *D10B 2403/0241* (2013.01); *D10B 2501/043* (2013.01); *Y10T 428/24628* (2015.01)

(58) Field of Classification Search
USPC ........ 428/105, 107, 109, 110, 111, 114, 122, 428/123, 190
See application file for complete search history.

(56) References Cited

U.S. PATENT DOCUMENTS

| | | | |
|---|---|---|---|
| 4,785,558 A | 11/1988 | Shiomura et al. |
| 4,863,776 A | 9/1989 | Sternlieb |
| 5,149,583 A | 9/1992 | Saarikettu |
| 5,475,904 A | 12/1995 | Le Roy |
| 5,601,907 A | 2/1997 | Matsumoto |
| 5,713,399 A | 2/1998 | Collette et al. |
| 6,052,921 A | 4/2000 | Oreck |
| 6,119,371 A | 9/2000 | Goodwin et al. |
| 6,533,885 B2 | 3/2003 | Davis et al. |
| 6,544,910 B2 | 4/2003 | Himmelsbach et al. |
| 6,835,257 B2 | 12/2004 | Perrine |
| 6,854,296 B1 | 2/2005 | Miller, III |
| 6,910,288 B2 | 6/2005 | Dua |
| 6,957,504 B2 | 10/2005 | Morris |
| 7,076,891 B2 | 7/2006 | Goodwin |
| 7,316,840 B2 | 1/2008 | Neculescu et al. |
| 7,479,195 B2 | 1/2009 | Leidig et al. |
| 7,568,298 B2 | 8/2009 | Kerns |
| 7,718,249 B2 | 5/2010 | Russell et al. |
| 7,776,171 B2 | 8/2010 | Lehto et al. |
| 7,824,513 B2 | 11/2010 | Chernyak et al. |
| 7,883,594 B2 | 2/2011 | Albanese et al. |
| 8,056,287 B2 | 11/2011 | Demello |
| 8,132,340 B2 | 3/2012 | Meschter |
| 8,266,827 B2 | 9/2012 | Dojan et al. |
| 8,312,645 B2 | 11/2012 | Dojan et al. |
| 8,312,646 B2 | 11/2012 | Meschter et al. |
| 8,800,172 B2 | 8/2014 | Dua et al. |
| 8,881,430 B2 | 11/2014 | Seamarks et al. |
| 8,887,410 B2 | 11/2014 | Dojan et al. |
| 8,893,405 B2 | 11/2014 | Dojan et al. |
| 9,132,601 B2 | 9/2015 | Beye et al. |
| 9,226,548 B2 | 1/2016 | Follet et al. |
| 9,241,537 B2 | 1/2016 | Beye et al. |
| 2003/0046843 A1 | 3/2003 | Chien |
| 2004/0181972 A1 | 9/2004 | Csorba |
| 2008/0110048 A1 | 5/2008 | Dua et al. |
| 2008/0110049 A1 | 5/2008 | Sokolowski et al. |
| 2010/0154256 A1 | 6/2010 | Dua et al. |
| 2010/0186874 A1 | 7/2010 | Sussmann |
| 2010/0192410 A1 | 8/2010 | Marvin et al. |
| 2010/0251564 A1 | 10/2010 | Meschter |
| 2010/0323148 A1 | 12/2010 | Lafond et al. |
| 2011/0192058 A1 | 8/2011 | Beers et al. |
| 2011/0192059 A1 | 8/2011 | Spanks et al. |
| 2012/0023778 A1 | 2/2012 | Dojan et al. |
| 2012/0198727 A1 | 8/2012 | Long |
| 2012/0233882 A1 | 9/2012 | Huffa et al. |
| 2013/0019500 A1 | 1/2013 | Greene |
| 2013/0145652 A1 | 6/2013 | Podhajny et al. |
| 2014/0068968 A1 | 3/2014 | Podhajny et al. |
| 2014/0196310 A1 | 7/2014 | Beye et al. |
| 2014/0196311 A1 | 7/2014 | Follet et al. |

FOREIGN PATENT DOCUMENTS

| | | |
|---|---|---|
| EP | 1055757 A1 | 11/2000 |
| EP | 1184499 A1 | 3/2002 |
| EP | 1367913 B1 | 2/2008 |
| WO | 9003744 A1 | 4/1990 |
| WO | 2012015588 A1 | 2/2012 |

OTHER PUBLICATIONS

International Preliminary Report on Patentability and Written Opinion for Application No. PCT/US2014/011387, issued on Jul. 21, 2015.
International Preliminary Report on Patentability and Written Opinion for Application No. PCT/US2014/011389, issued on Jul. 21, 2015.
International Preliminary Report on Patentability and Written Opinion for Application No. PCT/US2014/011392, issued on Jul. 21, 2015.
International Search Report and Written Opinion for Application No. PCT/US2014/011386 mailed on Jul. 4, 2014.
International Search Report and Written Opinion for Application No. PCT/US2014/011387 mailed on Jun. 30, 2014.
International Search Report and Written Opinion for Application No. PCT/US2014/011389 mailed on Jul. 15, 2014.
International Search Report and Written Opinion for Application No. PCT/US2014/011392, mailed on Nov. 6, 2014.

SPACER TEXTILE MATERIAL WITH CHANNELS HAVING MULTIPLE TENSILE STRANDS

CROSS-REFERENCE TO RELATED APPLICATIONS

This application is a continuation of U.S. Patent Publication Number 2014/0196311, now U.S. patent application Ser. No. 13/741,440, filed Jan. 15, 2013 and titled "Spacer Textile Material With Channels Having Multiple Tensile Strands," the entirety of which is herein incorporated by reference.

RELATED APPLICATIONS

This application is related to the following commonly owned applications: Follett, U.S. Pat. No. 9,095,186, issued Aug. 4, 2015, entitled "Article of Footwear Incorporating Braided Tensile Strands"; Beye et al., U.S. Pat. No. 9,132,601, issued Sep. 15, 2015, entitled "Spacer Textile Material With Tensile Strands Having Multiple Entry and Exit Points"; Beye et al., U.S. Patent Application Publication Number 2014/0196310, published Jul. 17, 2014, now U.S. patent application Ser. No. 13/741,433, filed Jan. 15, 2013, and entitled "Spacer Textile Material with Tensile Strands in Non-Linear Arrangements"; and Beye et al., U.S. Patent Application Publication Number 2014/0196315, published Jul. 17, 2014, now U.S. patent application Ser. No. 13/741,435, filed Jan. 15, 2013, and entitled "Spacer Textile Material with Tensile Strands That Intersect", which are all incorporated by reference herein in their entireties.

BACKGROUND

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust the fit of the footwear, as well as permitting entry and removal of the foot from the void within the upper. In addition, the upper may include a tongue that extends under the lacing system to enhance adjustability and comfort of the footwear, and the upper may incorporate a heel counter.

The various material elements forming the upper impart specific properties to different areas of the upper. For example, textile elements may provide breathability and may absorb moisture from the foot, foam layers may compress to impart comfort, and leather may impart durability and wear-resistance. As the number of material elements increases, the overall mass of the footwear may increase proportionally. The time and expense associated with transporting, stocking, cutting, and joining the material elements may also increase. Additionally, waste material from cutting and stitching processes may accumulate to a greater degree as the number of material elements incorporated into an upper increases. Moreover, products with a greater number of material elements may be more difficult to recycle than products formed from fewer material elements. By decreasing the number of material elements, therefore, the mass of the footwear and waste may be decreased, while increasing manufacturing efficiency and recyclability.

The sole structure is secured to a lower portion of the upper so as to be positioned between the foot and the ground. In athletic footwear, for example, the sole structure includes a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. The outsole forms a ground-contacting element of the footwear and is usually fashioned from a durable and wear-resistant rubber material that includes texturing to impart traction. The sole structure may also include a sockliner positioned within the upper and proximal a lower surface of the foot to enhance footwear comfort.

SUMMARY

In one aspect, a spacer textile material includes a first layer, a second layer and a plurality of connecting members extending between and joining the first layer and the second layer. The spacer textile material also includes a channel bounded by portions of the first layer and the second layer that are in direct contact as well as a first tensile strand and a second tensile strand. A portion of the first tensile strand and a portion of the second tensile strand are both disposed within the channel.

In another aspect, a spacer textile material includes a first layer, a second layer and a plurality of connecting members extending between and joining the first layer and the second layer. The spacer textile material also includes a first tensile strand, a second tensile strand and a third tensile strand as well as a channel bounded by portions of the first layer and the second layer that are in direct contact. A first portion of the first tensile strand, a first portion of the second tensile strand and a first portion of the third tensile strand are disposed within the channel.

In another aspect, an article of footwear includes an upper and a sole structure, where at least a portion of the upper further includes a spacer textile material with a first layer, a second layer and a plurality of connecting members extending between and joining the first layer and the second layer. The spacer textile material also includes a first tensile strand and a second tensile strand and channel bounded by portions of the first layer and the second layer that are in direct contact. A first portion of the first tensile strand and a first portion of the second tensile strand are disposed in the channel.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
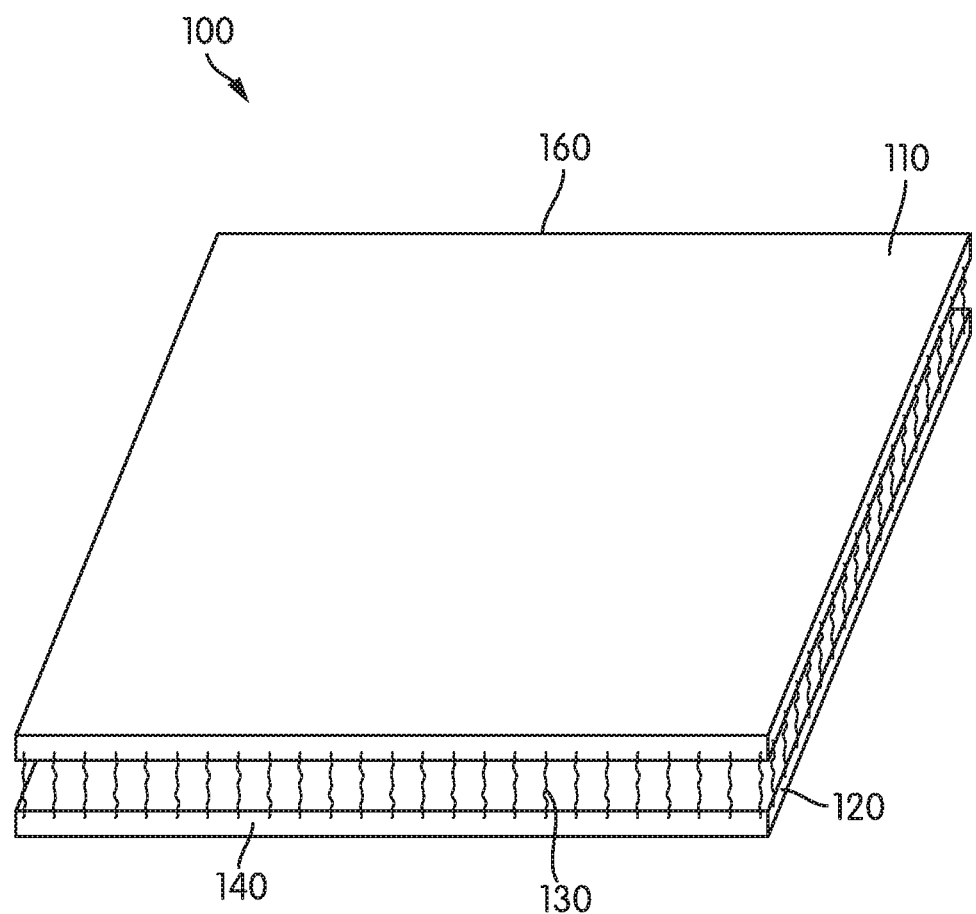
FIG. 1 shows an embodiment of the spacer textile material.

FIG. 1 illustrates an embodiment of a spacer textile material 100. In one embodiment, spacer textile material 100 may include a first layer 110, as well as a second layer 120 that is at least partially coextensive with first layer 110. In addition, spacer textile material 100 may have a plurality of connecting members 130 that extend between and join first layer 110 and second layer 120.

Connecting members 130 may be arranged to form a series of rows. The rows of connecting members 130 are separated by various spaces. In some embodiments, the rows formed by connecting members 130 may be substantially parallel to each other and distributed at substantially equal distances across spacer textile material 100. In other embodiments, the rows could be non-parallel and/or unevenly spaced apart. Spaces may be areas within spacer textile material 100 where connecting members 130 are absent. Typically, spaces may include areas between the rows formed by connecting members 130.

Spacer textile material 100 also may define at least a pair of opposite edges, first edge 140 and second edge 160, which are also edges of first layer 110 and second layer 120. In some embodiments, each of first edge 140 and second edge 160 may be substantially parallel to the rows formed by connecting members 130.

The spacer textile material may be formed by any suitable method for manufacturing such a material. A general process may include one or more yarns being fed into a conventional knitting apparatus. The knitting apparatus may mechanically manipulate yarns to form each of a first layer and a second layer. The knitting apparatus may also manipulate yarns to form connecting members between the first and second layers. As such, the first layer and second layer may be knitted layers, and the connecting members may be sections of at least one yarn that extend between the first layer and second layer. Moreover, the process forms spaces, edges, and stabilization structures.

Once formed, the spacer textile material exits the knitting apparatus and is collected on a roll. After a sufficient length of spacer textile material is collected, the roll may be shipped or otherwise transported to a manufacturer to utilize the spacer textile material for the manufacture of footwear or for any other purposes. Although not always performed, the spacer textile material may be subjected to various finishing operations (e.g., dying, fleecing) prior to being collected on a roll.

Examples of spacer textile material and methods of making spacer textile material are disclosed in any of the following: Chao et al., U.S. Patent Publication Number 2013/0266773, entitled, "Spacer Textile Materials and Methods for Manufacturing the Spacer Textile Materials," published on Oct. 10, 2013; Goodwin et al., U.S. Pat. No. 6,119,371, entitled "Resilient Bladder for Use in Footwear," issued on Sep. 19, 2000; and Goodwin, U.S. Pat. No. 7,076,891, entitled "Flexible Fluid-Filled Bladder for an Article of Footwear," issued on Jul. 18, 2006, the entirety of each being incorporated by reference.

Some embodiments of a spacer textile material may include a tensile strand. In some embodiments, one or more portions of the tensile strand may be located between the first layer and the second layer. In some embodiments, one or more portions of the tensile strand may be disposed in channels that may be created by joining a first layer and second layer of the spacer textile material. After assembly, the tensile strand may move freely within the one or more channels.

Figure 2:
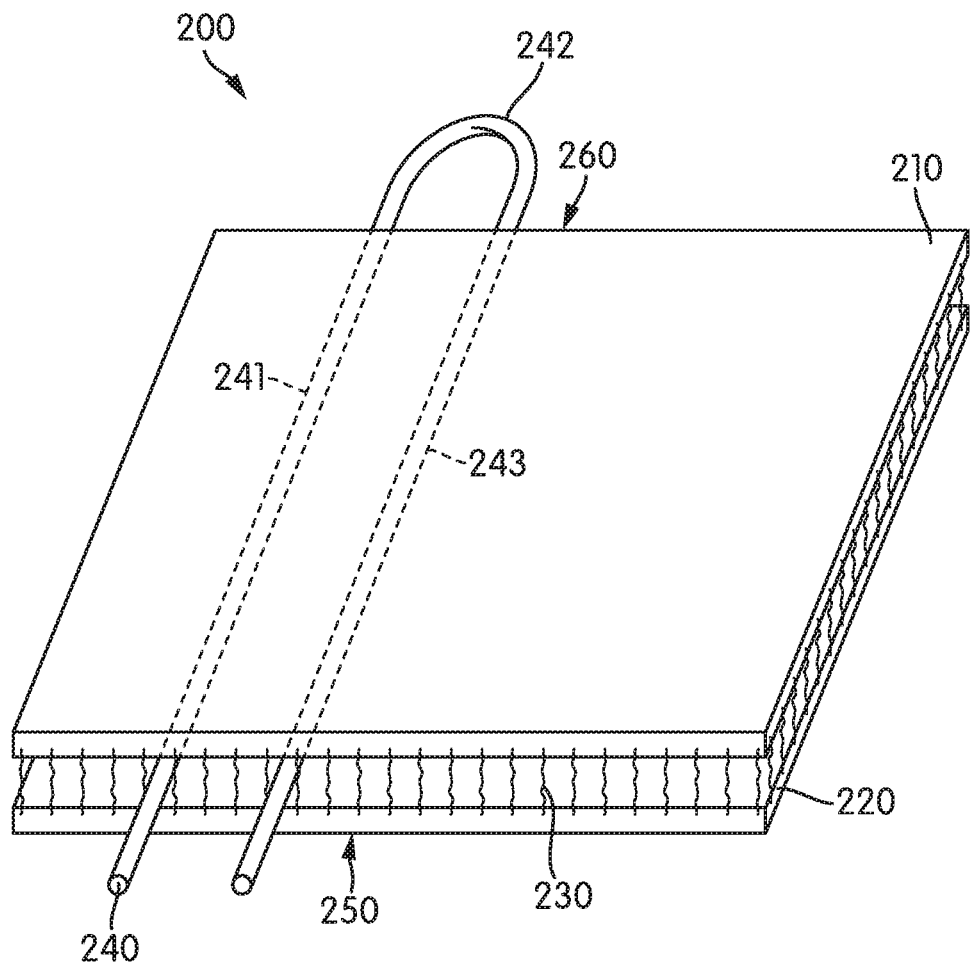
FIG. 2 shows an embodiment of the spacer textile material having a tensile strand disposed between a first layer and a second layer.

As discussed above, the spacer textile material may include at least one tensile strand. The tensile strand may be located in any portion of the spacer textile material. FIG. 2 shows an embodiment of a spacer textile material 200. Spacer textile material 200 may include tensile strand 240. Further, spacer textile material 200 may include a plurality of connecting members 230 that extend between and join first layer 210 and second layer 220. Connecting members 230 may be arranged to form a series of rows that are separated by various spaces. A portion of tensile strand 240 may be disposed between first layer 210 and second layer 220. In particular, tensile strand 240 may be disposed in the space created between connecting members 230.

Spacer textile material 200 also defines at least a pair of opposite edges, first edge 250 and second edge 260. First edge 250 and second edge 260 also may be edges of first layer 210 and second layer 220. In some embodiments, each of first edge 250 and second edge 260 may be substantially parallel to the rows formed by connecting members 230. However, in other embodiment, first edge 250 and/or second edge 260 may not be parallel with the rows formed by connecting members 230.

In different embodiments, the arrangement of a tensile strand within a spacer textile material can vary. For example, various portions of a tensile strand may extend through spacer textile material (i.e., between a first layer and a second layer) in parallel with, or at various angles to, one or more edges of the spacer textile material. Additionally, in some embodiments, different portions or segments of a tensile strand may be aligned in parallel with one another. In other embodiments, different portions or segments of a tensile strand could be disposed at various angles to one another.

An exemplary arrangement of a tensile strand within a spacer textile material is shown in FIG. 2. In the embodiment shown in FIG. 2, a first portion 241 of tensile strand 240 may be disposed between first layer 210 and second layer 220 of spacer textile material 200. Moreover, first portion 241 may generally extend from first edge 250 to second edge 260. In addition, a third portion 243 of tensile strand 240 may also be disposed between first layer 210 and second layer 220 of spacer textile material 200 and may likewise extend between first edge 250 and second edge 260. Furthermore, a second portion 242 of tensile strand 240 may be disposed between first portion 241 and third portion 243. In contrast to first portion 241 and third portion 243, which may be disposed between adjacent layers of spacer textile material 200, second portion 242 may extend outwardly from second edge 260 such that second portion 242 is not disposed between first layer 210 and second layer 220. In some embodiments, second portion 242 forms a loop that extends from second edge 260 of spacer textile material 200.

As one exemplary arrangement, first portion 241 and third portion 243 are shown extending in parallel between first edge 250 and second edge 260. Moreover, first portion 241 and third portion 243 may be oriented in a direction that is approximately perpendicular to first edge 250 and second edge 260. However, as previously discussed, in other embodiments one or more portions could vary in their orientations relative to other portions of a tensile strand and/or could vary in their orientations relative to edges of a spacer textile material.

The tensile strands of the disclosure may be formed from any generally one-dimensional material. As utilized with respect to the present disclosure, the term "one-dimensional material" or variants thereof is intended to encompass generally elongate materials exhibiting a length that is substantially greater than a width and a thickness.

The tensile strands of the disclosure may be formed from any suitable material. Accordingly, suitable materials for a tensile strand, for example tensile strand 240 of FIG. 2, may include various filaments, fibers, yarns, threads, cables, cords, or ropes. Suitable material for a tensile strand may be formed from or include rayon, nylon, polyester, polyacrylic, silk, cotton, carbon, glass, aramids (e.g., para-aramid fibers and meta-aramid fibers), ultra high molecular weight polyethylene, liquid crystal polymer, copper, aluminum, steel, and various combination of these kinds of materials.

Filaments have an indefinite length and in some cases a single filament can be utilized as a tensile strand, such as tensile strand 240. Fibers have a relatively short length and generally go through spinning or twisting processes to produce a strand of suitable length. An individual filament utilized in a tensile strand may be formed from a single material (i.e., a monocomponent filament) or from multiple materials (i.e., a bicomponent filament). Similarly, different filaments may be formed from different materials. As an example, yarns utilized as tensile strand 240 may include filaments that may be formed from a common material, or may include filaments that may be formed from two or more different materials. Similar concepts also apply to threads, cables, or ropes.

The spacer textile material of the disclosure may include two or more tensile strands. In some embodiments, when the spacer textile material includes multiple tensile strands, the tensile strands may be made from the same material. In some embodiments, the tensile strands may be made from different materials. When the tensile strands are made from different materials, the tensile strands may include different characteristics. For example, a first tensile strand may stretch when a force is applied. In some embodiments, a second tensile strand may stretch less than first tensile strand. In other embodiments, a second tensile strand may stretch more than the first tensile strand.

In some embodiments, the thickness of tensile strands may also vary significantly to range from less than 0.03 millimeters to more than 5 millimeters, for example. Although one-dimensional materials will often have a cross-section where the width and the thickness are substantially equal (e.g., a round or square cross-section), some one-dimensional materials may have a width that is greater than a thickness (e.g., a rectangular, oval, or otherwise elongate cross-section). Despite the greater width, a material may be considered one-dimensional if the length of the material is substantially greater than the width and the thickness of the material.

In some embodiments having multiple tensile strands, the thickness of each strand may be the same. In other embodiments, the thickness of each tensile strand may be different. The relative thickness of two or more tensile strands may be selected according to various factors including desired strength, elasticity, manufacturing considerations as well as possible other factors.

Examples of suitable tensile strands are disclosed in any of the following: Dojan et al., U.S. Pat. No. 8,925,129, entitled, "Methods of Manufacturing Articles of Footwear With Tensile Strand Elements," issued on Jan. 6, 2015; Dojan et al., U.S. Pat. No. 8,819,963, entitled, "Articles of Footwear With Tensile Strand Elements," issued on Sep. 2, 2014; and Dojan et al., U.S. Pat. No. 8,973,288, entitled "Footwear Incorporating Angled Tensile Strand Elements," issued on Mar. 10, 2015, the entirety of each being hereby incorporated by reference.

A tensile strand can be configured in any pattern, configuration or arrangement in a spacer textile material. In some embodiments, a tensile strand can be confined to a particular region of a spacer textile material. In other embodiments, a tensile strand may be associated with multiple different regions of a spacer textile material, including the entirety of the spacer textile material. Moreover, a tensile strand can extend through a spacer textile material (i.e., between adjacent layers), as well as outside of the layers that form the spacer textile material. In some embodiments, portions of a tensile strand may extend along an outer surface or outer face of a layer. In still other embodiments, portions of a tensile strand could extend along an edge of a spacer textile material.

For purposes of this disclosure, the term "opening" may include a space along an edge of the spacer textile material between a first layer and a second layer that is also between connecting members of the spacer textile material. Further, the term "opening" may include a space between the knitted strands of the first layer or second layer of the spacer textile. Further, the term "opening" may include a space, slit or hole in the first layer or second layer created during the preparation of the spacer textile material. As stated above, the tensile strand may be disposed through any opening on the spacer textile material.

The figures of this disclosure may show the ends of each tensile strand extending beyond the edges or faces of one or more layers of the spacer textile material. However, the ends of each tensile strand may be finished in any suitable manner. For example, in some embodiments, the tensile strand ends may extend beyond the edge of the spacer material. In such an embodiment, the ends of the tensile strand may extend into a second material or structure. Further, the ends of the tensile strand may be knotted or tied off so that the ends may not recess into the spacer textile material. Further, the ends may extend into the spacer textile material in a second direction and continue to extend throughout the material in a selected manner or pattern. In other embodiments, the ends of the tensile strand may be flush with the edge of the spacer textile material. Still further, the end of the tensile strand may be joined to the edge of one or more layers of the spacer textile material.

In addition to a tensile strand, the spacer textile material may include provisions for restricting the movement of the tensile strand within the spacer textile material. In some embodiments, a spacer textile material can include provisions for restricting the movement of one portion of the tensile strand. In other embodiments, a spacer textile material can include provisions for restricting two or more portions of a tensile strand (for example, two adjacent sides or ends of a tensile strand). In some embodiments, a spacer textile material can include one or more channels that act to restrict or restrain the movement various portions of the tensile strand. For example, a tensile strand disposed inside a channel of a spacer textile material may move freely in a longitudinal direction of the channel, while motion of the tensile strand in the lateral direction of the channel may be restricted.

Figure 5:
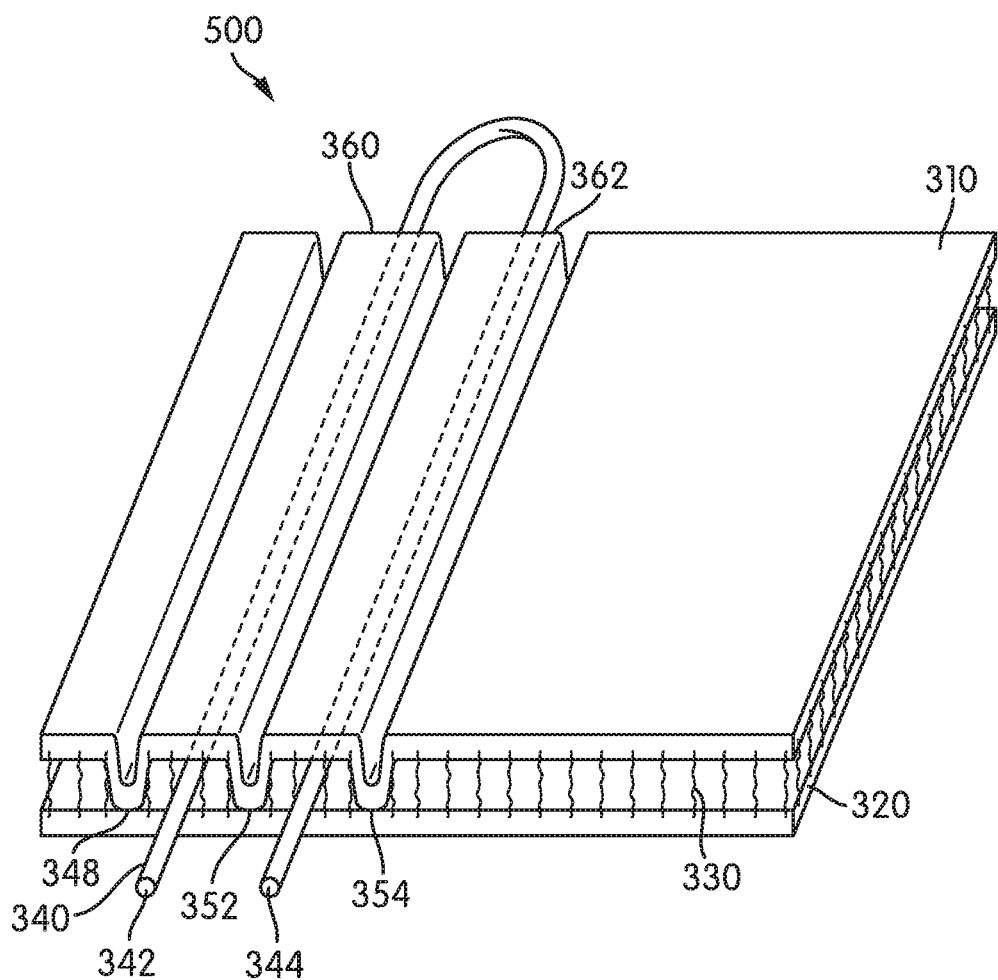
FIG. 5 is a schematic diagram of an embodiment of the spacer textile material having a tensile strand disposed in channels defined by one or more welds created by a welding method.

For instance, FIG. 5, which is discussed below is further detail, depicts spacer textile material 500 having portions of a tensile strand disposed within spacer textile material 500. Portions of a tensile strand may be further disposed in two channels, first channel 360 and second channel 362. As shown in FIG. 5, the tensile strand portions may be restricted in the lateral direction on both sides while the tensile strand portions are free to move within each channel in the longitudinal direction.

The channels formed in the spacer textile material may have any width. In some embodiments the width of the channel may accommodate one tensile strand. In other embodiments, the width of the channel may be large enough to accommodate two or more tensile strands. In addition, a first channel may have one width and a second channel may have a second width. The widths of multiple channels may be the same or the widths may be different. Further, the width of a single channel may change over the run of the channel. In other words, the width of the channel may vary throughout the length of the channel. For example, a channel may have a width that increases from a first edge to a second edge of a spacer textile material.

In some embodiments, channels of a spacer textile material may be bounded by portions of the first layer and the second layer that are in direct contact. In some embodiments, sections of the first layer and the second layer may be joined or fused to form one or more channels. The first layer may be joined to the second layer by any suitable method of joining such layers. In some embodiments, the first layer is joined to the second layer through a welding method. However, in other embodiments, the joining of the first layer and the second layer could be accomplished using other methods including, but not limited to: stitching, adhesives as well as other joining methods.

In some embodiments, the first layer and the second layer could be joined in a manner that forms one or more channels for guiding and controlling the configuration and possible motions of a tensile strand. For example, in some embodiments one or more welds could be used to join the first layer and the second layer such that adjacent welds form the walls of one or more channels.

In some embodiments, welding methods may be utilized to join the first layer to the second layer. The welding method utilized to join the first layer to the second layer may include a high frequency welding method. In some embodiments, the high frequency welding method may include an ultrasonic welding method or a radio frequency welding method.

In those embodiments that include ultrasonic welding methods, an ultrasonic welding device is used to join the first layer to the second layer of the spacer textile material. Ultrasonic welding devices utilize high frequency ultrasonic acoustic vibrations. The vibrations may be applied locally to a portion of the spacer textile material. Further, the vibrations applied to the spacer textile material cause friction. The friction softens the spacer textile material to fuse the first layer to the second layer. The fusion of the first layer to the second layer may be considered a solid state weld.

Examples of ultrasonic techniques and equipment are disclosed in any of the following: Albanese et al., U.S. Pat. No. 7,883,594, entitled "Wrapped pile weatherstripping and methods of making same," issued on Feb. 8, 2011; Chernyak, U.S. Pat. No. 7,824,513, entitled "Apparatus and method for making pile articles and improved pile articles made therewith," issued on Nov. 2, 2010; Lehto et al., U.S. Pat. No. 7,776,171, entitled "Arrangement and method for treatment of a material by means of an ultrasonic device," issued on Aug. 17, 2010; Perrine, U.S. Pat. No. 6,835,257, entitled "Ultrasonic weld pattern for adsorbent containing package" issued on Dec. 28, 2004; and Collette et al., U.S. Pat. No. 5,713,399, entitled "Ultrasonic seaming of abutting strips for paper machine clothing" issued on Feb. 3, 1998; the entirety of each being hereby incorporated by reference. One or more of the principles, concepts or methods disclosed in the cited references above may be implemented for preparing the welds on the spacer textile material of this disclosure.

Figure 3:
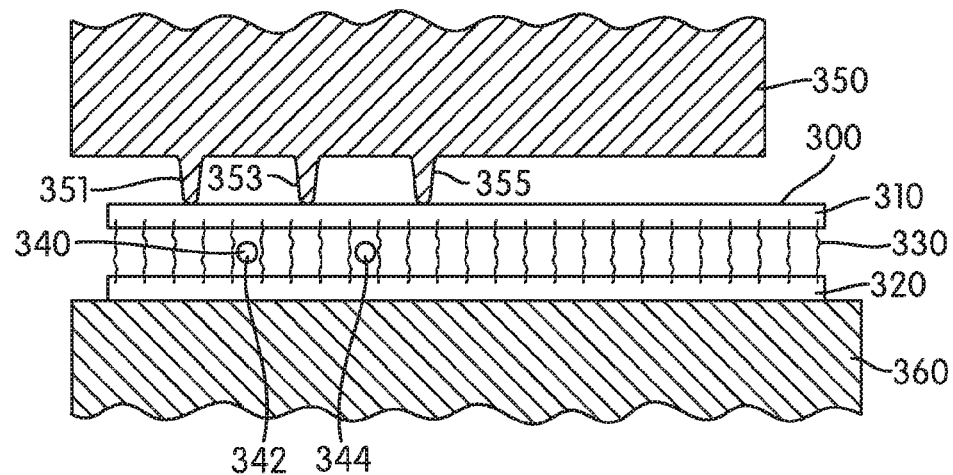
FIG. 3 is a schematic diagram of an embodiment of the spacer textile material having a tensile strand in a welding device prior to the joining of the first layer and second layer.

FIG. 3 shows an embodiment of spacer textile material 300 in a welding device. Spacer textile material 300 may include first layer 310, second layer 320 and connecting members 330. Spacer textile material 300 may further include a tensile strand 340 with first end 342 and second end 344. Tensile strand 340 may be located between first layer 310 and second layer 320.

In order to fuse portions of first layer 310 and second layer 320 together, spacer textile material 300 having tensile strand 340 may be positioned between a horn 350 and an anvil 360 of the welding device. As seen in FIG. 3, horn 350 may have a one or more protrusions. In some embodiments, horn 350 may have first protrusion 351, second protrusion 353, and third protrusion 355.

Each protrusion may form a pattern that is to be welded into the spacer textile material. The protrusions may form any suitable pattern. The patterns formed by one or more protrusions may include a stripe or line, parallel stripes or lines, perpendicular stripes or lines, a zig-zag pattern, a triangular pattern, and a wavy pattern, among other patterns.

For purposes of illustration, horn 350 and anvil 360 are shown schematically in the embodiments. Generally, the anvil 360 is a fixed component where the material to be welded rests or is nested. The horn 350 may be a sonotrode, which is connected to a transducer (not shown). The transducer causes the horn 350 to resonate or emit an acoustic vibration. In some embodiments, the frequency at which a horn vibrates may be between about 15 kHz and 85 kHz. Some examples of typical frequencies at which a horn vibrates include 15 kHz, 20 kHz, 30 kHz, 35 kHz, 40 kHz, and 70 kHz. The frequency chosen may depend on the material being welded as well as possibly other factors.

Horn 350 and anvil 360 come together under pressure to join a first material to a second material. In the embodiments shown in FIGS. 3 and 4, a first layer 310 is joined to a second layer 320 of spacer textile material 300. First layer 310 may be joined to second layer 320 in the location in which the material comes in contact with one or more of the protrusions, including first protrusion 351, second protrusion 353, and third protrusion 355, of horn 350.

Figure 4:
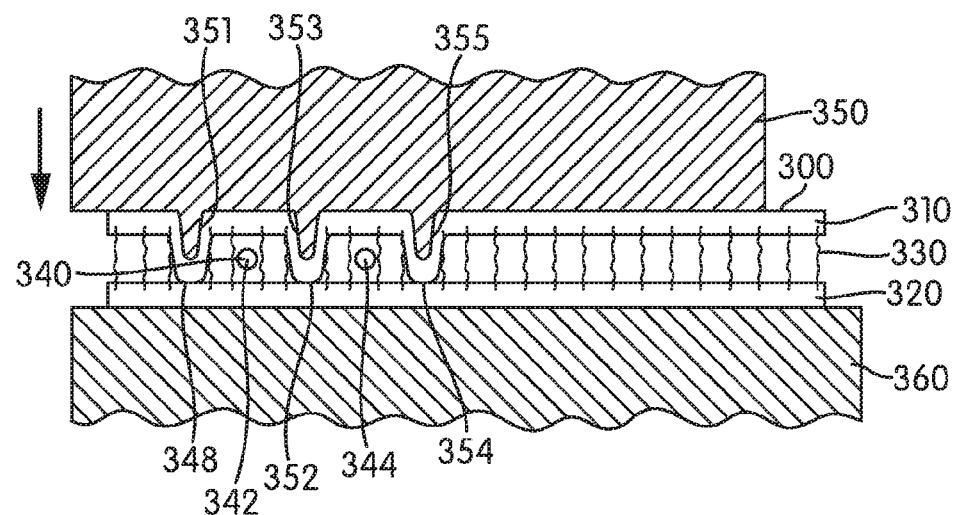
FIG. 4 is a schematic diagram of an embodiment of a welding device during the joining of the first layer and second layer of a spacer textile material having a tensile strand disposed between a first layer and a second layer.

FIG. 4 provides a schematic of an embodiment of an ultrasonic welding method. In FIG. 4, first protrusion 351, second protrusion 353 and third protrusion 355 of horn 350 cause first layer 310 to meet second layer 320 at first weld 348, second weld 352 and third weld 354. The transducer may be activated to cause horn 350 to resonate at a selected frequency. The vibrations of horn 350 generate friction between first layer 310 and second layer 320 of spacer textile material 300 and horn 350. The friction causes the materials of first layer 310 and second layer 320 to soften or melt. First layer 310 and second layer 320 may be allowed to cool to cause the layers to fuse to each other. Following this joining process, first layer 310 and second layer 320 may be fused or welded in those areas contacted by horn 350.

FIG. 5 depicts an embodiment of the welded spacer textile material 500. As can be seen, first weld 348, second weld 352 and third weld 354 may be generated by a welding device, as shown in FIG. 4. At each weld, first layer 310 may be fused to second layer 320. Further, first weld 348, second weld 352, and third weld 354 define two channels, first channel 360 and second channel 362. Both channels include portions of tensile strand 340. Tensile strand 340 is free to move in a longitudinal direction within the channels. However, the welds on both sides of tensile strand 340 restrain the lateral movement of tensile strand 340 within each channel of the spacer textile material 500.

In some embodiments, the welded spacer textile material, or a portion of the welded spacer textile material, may be incorporated into footwear, for example, as shown in FIG. 14, discussed below in further detail. In some cases, the spacer textile material may be configured for use in a wide range of athletic footwear styles, including running shoes, basketball shoes, cross-training shoes, football shoes, golf shoes, hiking shoes and boots, ski and snowboarding boots, soccer shoes, tennis shoes, and walking shoes, for example. Concepts associated with the spacer textile material may also be utilized with footwear styles that are generally considered to be primarily non-athletic, including dress shoes, loafers, sandals, casual shoes, clogs, flats, heels, pumps, wedges, and work boots.

In addition to footwear, the spacer textile material may be incorporated into other types of apparel and athletic equipment, including helmets, gloves, and protective padding for sports, such as football and hockey. Similar material may also be incorporated into cushions and other compressible structures utilized in household goods and industrial products.

Additionally, the discussion and figures disclose various configurations of a spacer textile material. Although portions of the spacer textile material are disclosed as being incorporated into footwear, the spacer textile material may be utilized with a variety of other products or for a variety of other purposes. In some embodiments, the spacer textile material may be utilized in apparel, such shirts, shorts, pants, outerwear, sports uniforms/jerseys, hats, socks, and undergarments, among other pieces of apparel.

The welding method described above is not restricted to the patterns described in this disclosure. The welding device may be configured to prepare a spacer textile material with a wide variety of patterns and textures.

The spacer textile material may be formed from any suitable material. In some embodiments, the material used in making a spacer textile material may be suitable for the joining method utilized to join the first layer to the second layer of the spacer textile material.

In those embodiments where an ultrasonic welding method is utilized to join the first layer and second layer of the spacer textile material, the spacer textile material may be made of any material suitable for such a spacer textile configuration. Further, the spacer textile material may be made of any material suitable for high frequency welding methods. Materials suitable for high frequency welding include thermoplastic material or natural material coated with a thermoplastic material. Examples of material suitable for high frequency welding methods include an acrylic, a nylon, a polyester, a polylactic acid, a polyethylene, a polypropylene, polyvinyl chloride (PVC), an urethane, a natural fiber, such as cotton or wool, that is coated with one or more thermoplastic materials, such as an ethyl vinyl acetate or thermoplastic polyurethane, and combinations thereof.

In some embodiments, the first layer and the second layer of a spacer textile material may be made of the same material or combination of materials. In other embodiments, the first layer may be made of one suitable material or combination of materials, and the second layer may be made of a second suitable material or combination of materials that are different from the first layer.

Further, the connecting members of the spacer textile material may be made of any suitable material. In some embodiments, the material of the connecting member may be the same as the material of the first layer. In other embodiments, the material of the connecting members may be the same as the material of the second layer. In still further embodiments, the material of the connecting members may be substantially different than both the material of the first layer and the material of the second layer.

Other welding methods may be utilized to join layers of a spacer textile material. For example, in some embodiments a radio frequency (RF) welding method could be used. In some embodiments, radio frequency welding could be used with a hot melt adhesive. In some cases, the use of a hot melt adhesive may enhance the application of RF welding to a low mass spacer textile material.

Welding methods could also be used with a variety of different materials. In some embodiments, materials having desired channel geometry can be achieved by selecting a combination of a welding method and a suitable material or materials. For example, some embodiments could use thermoplastic polyurethane (TPU) in combination with ultrasonic welding to achieve the desired channel geometry on a portion of an upper or other section of an article.

Still other methods are possible for joining layers of a spacer textile material. As one example, in other embodiments, the first layer may be joined to the second layer by a thermal fusion method. The thermal fusion method may include heat bonding. Heat bonding methods include hot die heating, steam heating or hot air heating.

In further embodiments, the first layer may be joined to the second layer through stitching methods or weaving methods. In some embodiments, where the layers are joined through stitching methods, the material used to form the stitch may be the same as the material of the first layer or second layer. In other embodiments, the materials used to form the stitch may be a different material from both the first layer and the second layer of the spacer textile material.

It will be understood that the embodiments are not limited to any particular method for forming channels in a spacer textile material. In particular, the embodiments depict various configurations of a spacer textile material that allows for tensile strands (such as wires) to be captured and guided through various channels. Although the following embodiments may reference welding or welds used to join regions of layers in a spacer textile material, it should be understood that in other embodiments the regions of joined material could be created using stitching, gluing, as well as possibly other methods.

One or more tensile strands and/or associated channels could be arranged in a variety of configurations within a spacer textile material. As stated above, portions of the tensile strand may enter or exit the spacer textile material at any point on the material. Further, the tensile strands, and channels in which the tensile strands are disposed, may be arranged in any pattern including, but not limited to: linear patterns, non-linear patterns, regular patterns, irregular patterns as well as any other patterns.

Some embodiments may include provisions to provide enhanced support throughout one or more portions of a spacer textile material. In some embodiments, increased support can be accomplished by using two or more tensile strands in combination. In some embodiments, for example, portions of two or more tensile strands may extend through a single channel of a spacer textile material.

FIGS. 6 through 10 illustrate various different configurations or arrangements of one or more tensile strands in a spacer textile material. It will be understood that the following configurations are only intended to be exemplary and still other configurations may be possible in other embodiments. Moreover, features of the different embodiments may be combined to create still further arrangements for one or more tensile strands within a spacer textile material.

For purposes of convenience, the term "plurality of tensile strands" is used throughout this detailed description and in the claims to refer to any collection of two or more tensile strands. Likewise, the term "plurality of welds" refers to any collection of two or more welds on a spacer textile material. Still further, the term "plurality of channels" refers to any collection of two or more channels formed in a spacer textile material.

Figure 6:
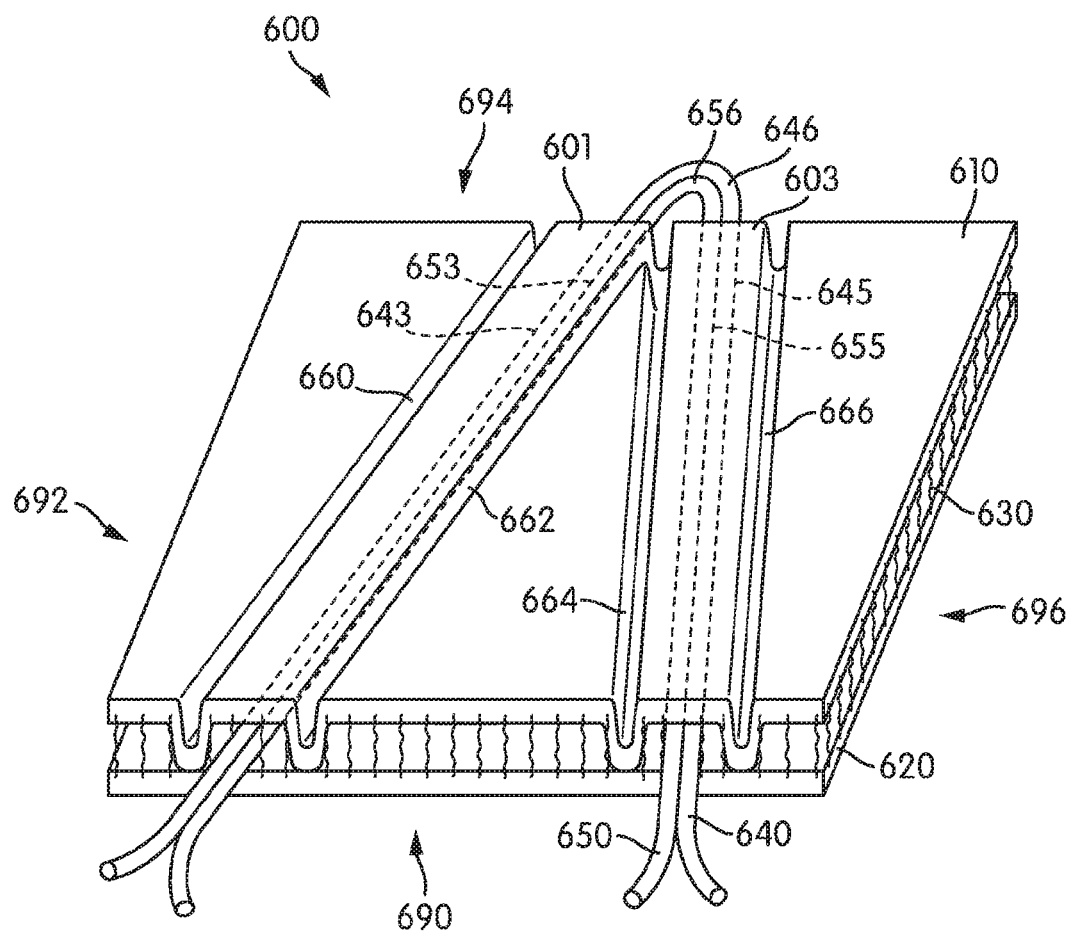
FIG. 6 is a schematic diagram of an embodiment of the spacer textile material having multiple tensile strands where the tensile strand may be disposed together in multiple channels.

FIG. 6 illustrates an embodiment of a configuration for a spacer textile material 600 that includes two tensile strands that may both extend through a first channel and a second channel. Referring to FIG. 6, portions of first tensile strand 640 and second tensile strand 650 may be disposed between first layer 610 and second layer 620 of a spacer textile material 600. Further, spacer textile material 600 may include a plurality of connecting members 630 that extend between and join first layer 610 and second layer 620. Spacer textile material 600 may have four edges, including first edge 690, second edge 692, third edge 694 and fourth edge 696, which are also edges of first layer 610 and second layer 620.

Spacer textile material 600 includes a first channel 601 and a second channel 603 that both generally extend from first edge 690 to third edge 694 of spacer textile material 600. First channel 601 may be bounded by first weld 660 and second weld 662, while second channel 603 may be bounded by third weld 664 and fourth weld 666.

In some embodiments, portions of both first tensile strand 640 and second tensile strand 650 may be disposed within first channel 601 and second channel 603. In particular, first portion 643 of first tensile strand 640 and first portion 653 of second tensile strand 650 may be disposed in first channel 601 between first edge 690 and third edge 694. Likewise, third portion 645 of first tensile strand 640 and third portion 655 of second tensile strand 650 may be disposed in second channel 603 between third edge 694 and first edge 690.

In some embodiments, second portion 646 of first tensile strand 640 and a second portion 656 of second tensile strand 650 may extend from spacer textile material 600 beyond third edge 694. In some embodiments, second portion 646 of first tensile strand 640 and a second portion 656 of second tensile strand 650 may form a loop between first channel 601 and a second channel 603 along third edge 694.

With this arrangement, spacer textile material 600 may be provided with increased support. In particular, the tensile strength provided along the directions of first channel 601 and second channel 603 may be increased through the use of more than one tensile strand. This may help increase support in the region of first channel 601 and second channel 603, for example in embodiments where a lace or other fastener is threaded through second portion 646 of first tensile strand 640 and second portion 656 of second tensile strand 650.

Figure 7:
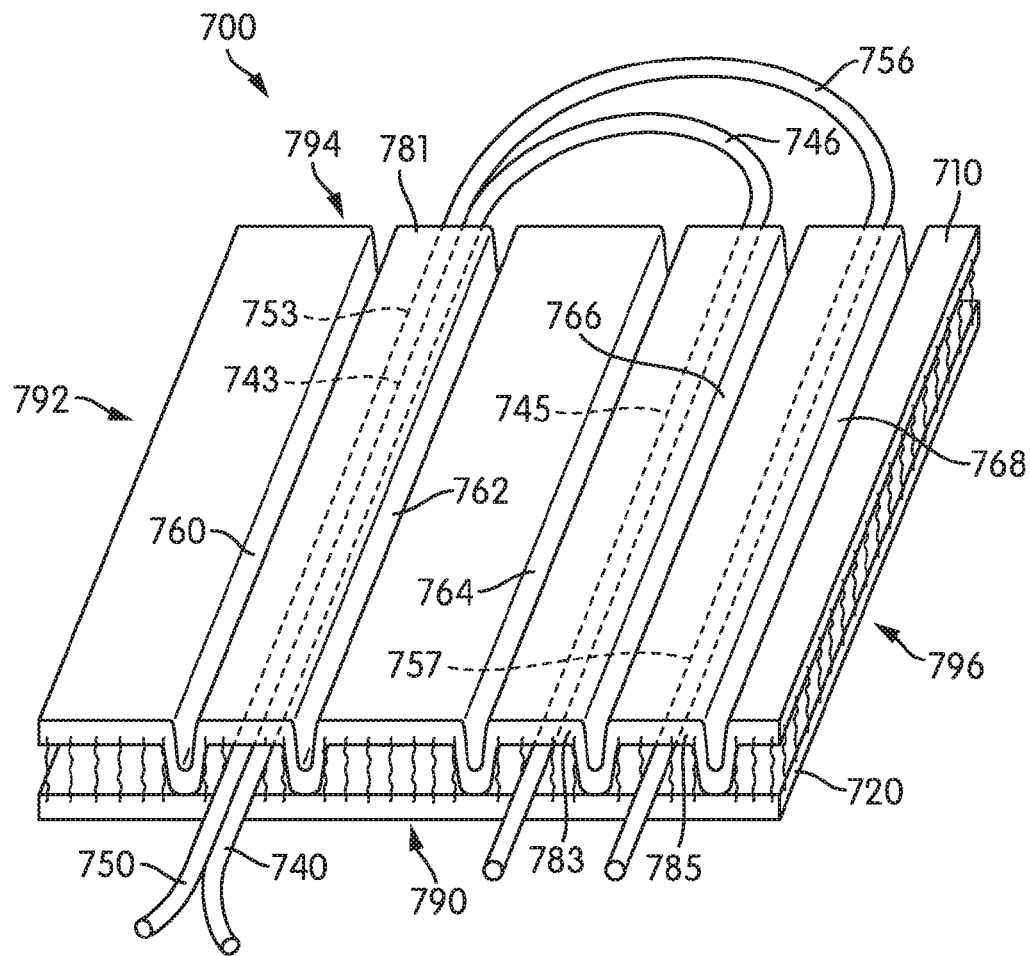
FIG. 7 is a schematic diagram of an embodiment of the spacer textile material having multiple tensile strands where the tensile strands may be disposed together in one channel and may be disposed individually in a second and third channel.

In still other embodiments, some channels on a spacer textile material may receive two tensile strands, while other channels may receive a single tensile strand. FIG. 7 illustrates an embodiment of spacer textile material 700 including a first tensile strand 740 and a second tensile strand 750. In this configuration, first tensile strand 740 and second tensile strand 750 extend through a common channel in some regions of spacer textile material 700 but are disposed in separate channels in other regions of spacer textile material 700. This arrangement may provide varying levels of tensile strength throughout different regions of spacer textile material 700.

Referring to FIG. 7, first tensile strand 740 and second tensile strand 750 may be disposed between first layer 710 and second layer 720 of a spacer textile material 700. Spacer textile material 700 may have four edges, including first edge 790, second edge 792, third edge 794 and fourth edge 796, which are also edges of first layer 710 and second layer 720.

Spacer textile material 700 further includes a first channel 781, a second channel 783 and a third channel 785 that all generally extend from first edge 790 to third edge 794 of spacer textile material 700. First channel 781 may be bounded by first weld 760 and second weld 762, second channel 783 may be bounded by third weld 764 and fourth weld 766 and third channel 785 may be bounded by fourth weld 766 and fifth weld 768.

In some embodiments, first tensile strand 740 and second tensile strand 750 may be disposed together in first channel 781. In particular, first portion 743 of first tensile strand 740 and first portion 753 of second tensile strand 750 may be disposed in first channel 781 between first edge 790 and third edge 794.

After exiting first channel 781, second portion 746 of first tensile strand 740 may extend from spacer textile material 700 beyond third edge 794. In some embodiments, second portion 746 of first tensile strand 740 may form a loop between first channel 781 and second channel 783 along third edge 794. Similarly, after exiting from first channel 781, second portion 756 of second tensile strand 750 may extend from spacer textile material beyond third edge 794. In some embodiments, second portion 756 of second tensile strand 750 also may form a loop between first channel 781 and a third channel 785 along third edge 794.

In some embodiments, third portion 745 of first tensile strand 740 may be disposed in second channel 783 between third edge 794 and first edge 790. Similarly, third portion 757 of second tensile strand 750 may be disposed in third channel 785 between third edge 794 and first edge 790.

This configuration of tensile strands may provide spacer textile material 700 with tensile strength that may vary through different portions of spacer textile material. For example, the portion of spacer textile material 700 associated with first channel 781 may have a substantially higher tensile strength than the portions of spacer textile material 700 associated with second channel 783 and third channel 785.

In still other embodiments, multiple tensile strands may be disposed in a channel and individually exit the spacer textile material through multiple openings in the outer face (or outer surface) of a layer of the spacer textile material.

Figure 8:
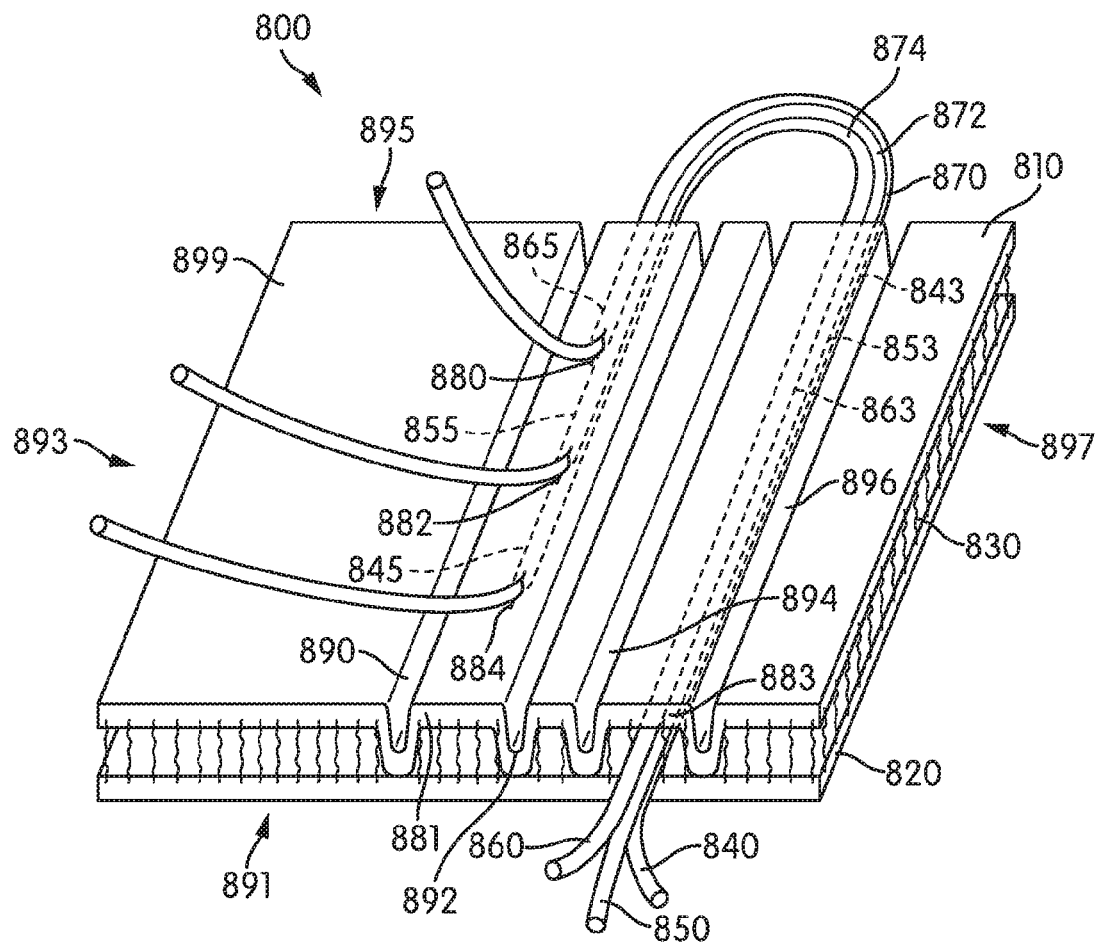
FIG. 8 is a schematic diagram of an embodiment of the spacer textile material having multiple tensile strands where the tensile strands may be disposed together in one channel, may be further disposed together in a second channel, and exit the second channel through multiple opening in the outer layer of the spacer textile material.

FIG. 8 illustrates an embodiment of spacer textile material 800 having three tensile strands. In this embodiment, portions of first tensile strand 840, second tensile strand 850, and third tensile strand 860 may be disposed between first layer 810 and second layer 820 of a spacer textile material 800. Spacer textile material 800 also may have four edges, including first edge 891, second edge 893, third edge 895 and fourth edge 897, which are also edges of first layer 810 and second layer 820. Further, spacer textile material 800 may include first weld 890, second weld 892, third weld 894, and fourth weld 896. First weld 890, second weld 892, third weld 894, and fourth weld 896 define two channels, including first channel 881 and second channel 883, in spacer textile material 800.

In the configuration of FIG. 8, each tensile strand may include at least three portions. A first portion of each tensile strand may extend through first channel 881. A second portion of each tensile strand may extend outwardly along third edge 895. Finally, a third portion of each tensile strand may partially extend through first channel 881. In particular, the third portion of each tensile strand may exit first channel 881 through an opening in the outer face 899 of first layer 810, as described in detail below.

In some embodiments, first tensile strand 840, second tensile strand 850, and third tensile strand 860 may be disposed together in second channel 883. In particular, first portion 843 of first tensile strand 840, first portion 853 of second tensile strand 850, and first portion 863 of third tensile strand 860 may be disposed in second channel 883 between first edge 891 and third edge 895.

In some embodiments, second portion 870 of first tensile strand 840, second portion 872 of second tensile strand 850 and second portion 874 of third tensile strand 860 may extend from spacer textile material beyond third edge 895. In some embodiments, second portion 870 of first tensile strand 840, second portion 872 of second tensile strand 850 and second portion 874 of third tensile strand 860 together may form a loop between second channel 883 and a first channel 881 along third edge 894.

In some embodiments, third portion 845 of first tensile strand 840 may be disposed in at least a portion of first channel 881. In some embodiments, third portion 845 may extend from spacer textile material 800 through third opening 884 in outer face 899 of first layer 810. Additionally, third portion 855 of second tensile strand 850 may be disposed in at least a portion of first channel 881. In some embodiments, third portion 855 may extend from spacer textile material 800 through second opening 882 in the outer face of first layer 810. Still further, third portion 865 of third tensile strand 860 may be disposed in at least a portion of first channel 881. In some embodiments, third portion 865 may extend from spacer textile material 800 through first opening 880 in the outer face of first layer 810.

The configuration described here and shown in FIG. 8 may allow the tensile strength across different portions of spacer textile material 800 to be fine tuned. Moreover, in some embodiments, this arrangement allows each tensile strand to be actuated individually, since the free ends of each tensile strand associated with first channel 881 are separated from one another.

In other embodiments, multiple tensile strands may be disposed in a channel in the spacer textile material. In some embodiments, multiple tensile strands may be twisted together in the form of a rope or cable, or may be braided.

Figure 9:
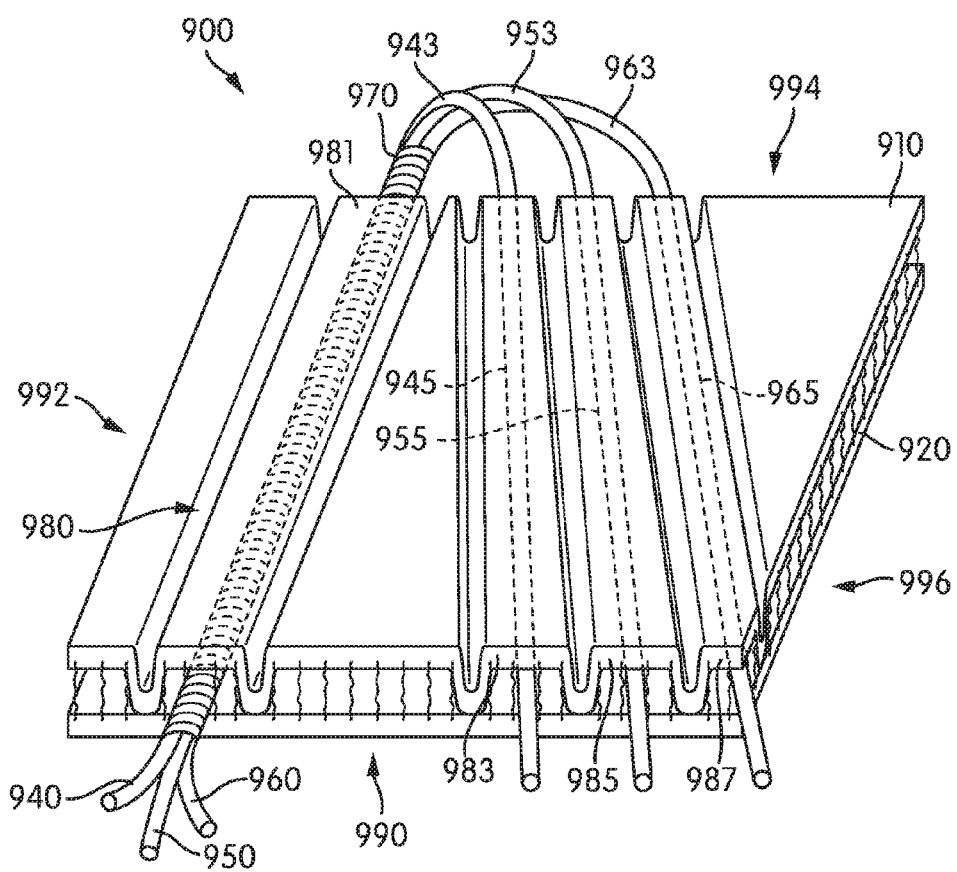
FIG. 9 is a schematic diagram of an embodiment of the spacer textile material having multiple tensile strands where the tensile strands may be in the form of a rope, braid or cable that may be disposed together in one channel and split to be further disposed in individual channels.

FIG. 9 illustrates still another possible configuration for a spacer textile material with multiple tensile strands. Referring to FIG. 9, portions of first tensile strand 940, second tensile strand 950, and third tensile strand 960 may be disposed between first layer 910 and second layer 920 of a spacer textile material 900. Spacer textile material 900 also may have four edges, including first edge 990, second edge 992, third edge 994 and fourth edge 996, which are also edges of first layer 910 and second layer 920.

Spacer textile material 900 may include a plurality of channels. In some embodiments, spacer textile material 900 may include four channels. In one embodiment, spacer textile material 900 includes first channel 981, second channel 983, third channel 985 and fourth channel 987. In some embodiments, each channel may be formed and bounded by plurality of welds 980.

In one embodiment, portions of first tensile strand 940, second tensile strand 950, and third tensile strand 960 maybe twisted or otherwise joined into a rope-like or cable-like configuration. In some embodiments, portions of first tensile strand 940, second tensile strand 950 and third tensile strand 960 may be joined in a braid-like configuration. Examples of suitable braids are disclosed in Follett, U.S. Pat. No. 9,095,186, issued Aug. 4, 2015 and titled, "Article of Footwear Incorporating Braided Tensile Strands". For purposes of this embodiment, the combined tensile strand will be referred to as braid 970, although the embodiment encompasses the combination in the form of a rope or cable.

In some embodiments, braid 970 may be disposed in first channel 981. In some cases, braid 970 may extend from spacer textile material beyond first edge 990 and/or third edge 994. While extended beyond third edge 994, braid 970 may separate into individual tensile strands, including first tensile strand 940, second tensile strand 950, and third tensile strand 960.

In some embodiments, first portion 943 of first tensile strand 940 may extend from braid 970 to second channel 983 to form a loop between braid 970 and second channel 983 along third edge 994. Furthermore, second portion 945 of first tensile strand 940 may be disposed in second channel 983 between third edge 994 and first edge 990.

Similarly, first portion 953 of second tensile strand 950 may extend from braid 970 to third channel 985 to form a loop between braid 970 and third channel 985 along third edge 994. Furthermore, second portion 955 of second tensile strand 950 may be disposed in third channel 985 between third edge 994 and first edge 990.

In addition, first portion 963 of third tensile strand 960 may extend from braid 970 to fourth channel 987 to form a loop between braid 970 and fourth channel 987 along third edge 994. Furthermore, second portion 965 of third tensile strand 960 may be disposed in fourth channel 987 between third edge 994 and first edge 990.

By combining two or more tensile strands into a braid-like configuration, the tensile strength in the region of first channel 981 may be substantially increased.

The above described spacer textile material may be incorporated into at least a portion of an article of footwear. The spacer textile material may be incorporated into at least a portion of an upper for an article of footwear. In some embodiments, an upper may be made of a spacer textile material. When incorporated into a upper, the spacer textile material may have any number of tensile strands. In some embodiments, portion of at least two tensile strands may be disposed within the same channel.

Figure 10:
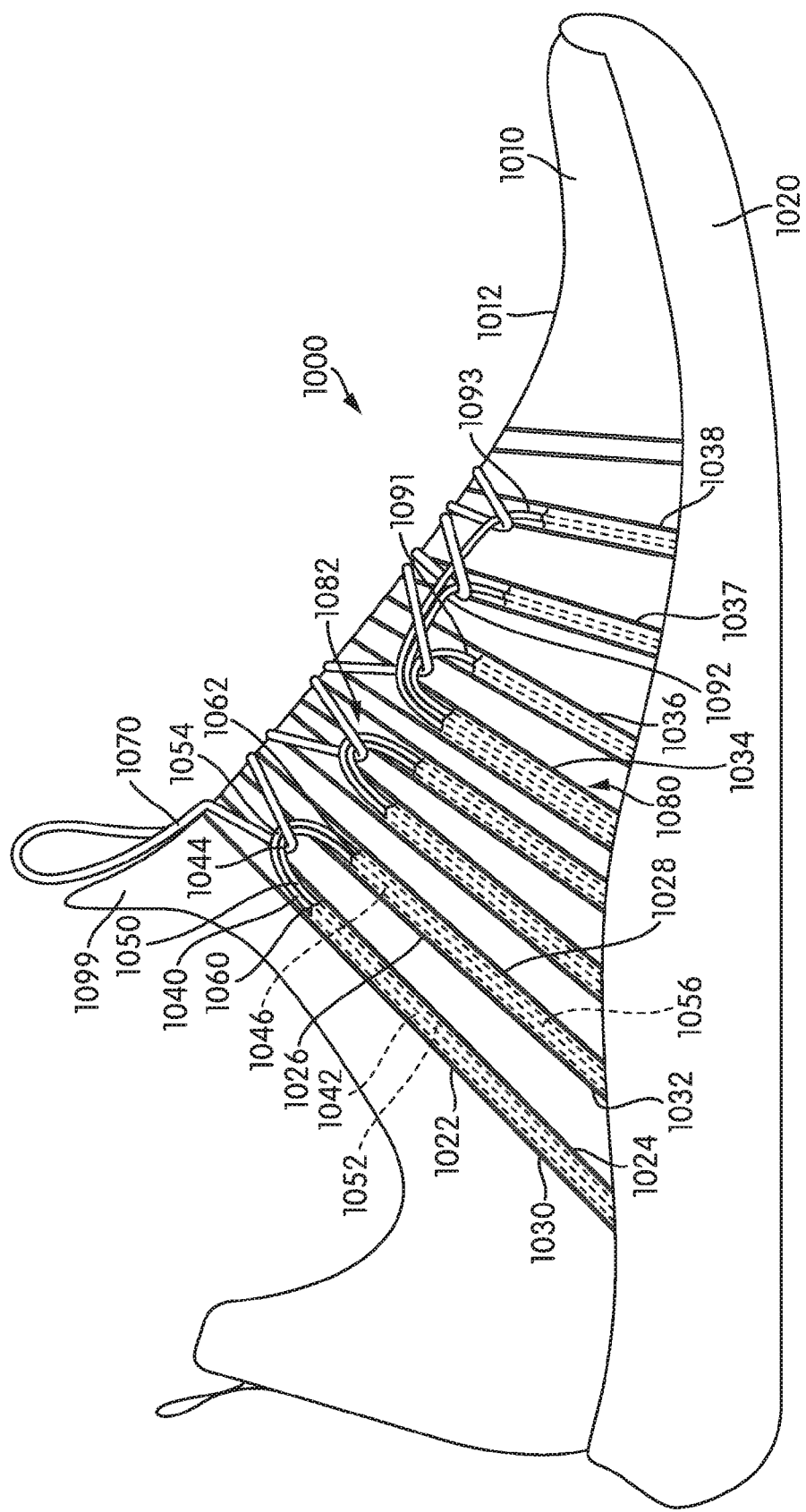
FIG. 10 is a schematic diagram of an embodiment of an article of footwear incorporating a spacer textile material having multiple tensile strands disposed together in at least one channel as a portion of the upper of the article of footwear.

FIG. 10 illustrates a schematic view of an embodiment of article of footwear 1000. Article of footwear 1000, or simply article 1000, may include an upper 1012 and a sole structure 1020. In some embodiments, a portion of upper 1012 may be made of a spacer textile material 1010.

As shown in FIG. 10, spacer textile material 1010 may include multiple welds that define multiple channels. In some embodiments, spacer textile material 1010 may include plurality of channels 1080 as well as a corresponding plurality of tensile strands 1082. For purposes of clarity, the following discussion describes details of one set of channels and a corresponding pair of tensile strands, however, it will be understood that the discussion of these channels and tensile strands may similarly apply to the remaining channels and tensile strands disposed along upper 1012.

In one embodiment, first weld 1022 and second weld 1024 define first channel 1030. Similarly, third weld 1026 and fourth weld 1028 define second channel 1032. Each of first channel 1030 and second channel 1032 may be configured to receive one or more tensile strands. In one embodiment, first channel 1030 and second channel 1032 may each be configured to receive portions of first tensile strand 1040 and second tensile strand 1050.

First portion 1042 of first tensile strand 1040 may be disposed in first channel 1030. In addition, first portion 1052 of second tensile strand 1050 also may be disposed in first channel 1030. Further, first portion 1042 of first tensile strand 1040 and first portion 1052 of second tensile strand 1050 may extend from sole structure 1020 within first channel 1030 to first opening 1060 disposed on outer face 1099 of the outer layer of spacer textile material 1010. First tensile strand 1040 and second tensile strand 1050 may extend from spacer textile material 1010 through first opening 1060. In some embodiments, second portion 1044 of first tensile strand 1040 and second portion 1054 of second tensile strand 1050 may form a loop on the exterior of spacer textile material 1010. Moreover, portion 1044 and portion 1054 may be disposed between first opening 1060 and second opening 1062.

Third portion 1046 of first tensile strand 1040 and third portion 1056 of second tensile strand 1050 may be further disposed in the spacer textile material through second opening 162. Moreover, portion 1046 and portion 1056 may extend from second opening 1062 within second channel 1032 to sole structure 1020.

Portions of each of the remaining tensile strands of plurality of tensile strands 1082 may be similarly disposed in the remaining channels of plurality of channels 1080 of spacer textile material 1000. Moreover, while the current embodiment illustrates a substantially similar configuration for some sets of tensile strands and channels on article 1000, in other embodiments any other pattern or arrangement of tensile strands and channels could be used with spacer textile material 1010 and article 1000.

FIG. 10 also illustrates a configuration in which three or more tensile strands disposed in a single channel may separate into at least three separate strands upon leaving the channel. For example, channel 1034 comprises a single channel configured to hold three tensile strands, including tensile strand 1091, tensile strand 1092 and tensile strand 1093. Each tensile strand may exit channel 1034 at which point tensile strand 1091, tensile strand 1092 and tensile strand 1093 may separate and loop through adjacent sections of shoe lace 1070, before entering channel 1036, channel 1037 and channel 1038, respectively. This arrangement may allow the tension along the forward region of article 1000 to be tuned by varying the tension applied throughout different sections of shoe lace 1070. Although this embodiment illustrates three strands that are generally laid adjacent to one another within channel 1034, in other embodiments the strands could be arranged in any other manner, including a braided arrangement.

In some embodiments, tensile strands also may extend at least partially around lace apertures or act as lace apertures themselves. As such, a tensile strand may extend (a) upward from lower region of the upper or from the sole structure to a lace region, (b) exit and reenter the spacer textile materials forming a loop in the lace region, and (c) travels downward from lace region to the lower region of the upper or the sole structure. In this manner, the loops formed from the tensile strands effectively are lace apertures. A shoe lace may be laced through the tensile strand loops.

As shown in FIG. 10, a portion of each tensile strand may be disposed on the outer face or surface of spacer textile material 1010. In some embodiments, this exposed portion of each tensile strand may be a loop that may be utilized as a shoe lace eyelet. In some embodiments, a shoe lace may be inserted through multiple loops formed on upper 1012. For example, second portion 1044 of first tensile strand 1040 together with second portion 1054 of second tensile strand 1050 forms a loop on the exterior of spacer textile material 1010. The loop may be disposed between first opening 1060 and second opening 1062. In some embodiments, the loop may also act as an eyelet to receive the shoe lace 1070.

When shoe lace 1070 is tightened, first tensile strand 1040 and second tensile strand 1050 are also tightened, or in other words, placed under an increased tension. In a similar manner, the remaining tensile strands of plurality of tensile strands 1082 may be tightened as shoe lace 1070 is tightened. The tightened tensile strands may provide better support and a better fit for the wearer of the shoe in the particular area that tensile strands are disposed about spacer textile material 1010. This arrangement has the advantage of tightening the upper around the foot and further (a) limiting excess movement of the foot relative to the sole structure and the upper, and (b) ensuring that the foot remains properly positioned relative to the sole structure and the upper.

In addition, in some embodiments, each tensile strand may have the same stretch and flexibility. In other embodiments, each tensile strand may have different flexibility or stretch. Accordingly, a tensile strand may be selectively disposed in or about the spacer textile material in specific locations to provide specific support. For instance, a tensile strand having less flexibility or stretch may be located in or about the spacer textile material of the shoe upper in an area that requires more support. Further, a tensile strand having greater flexibility or stretch may be located in or about the spacer textile material of the shoe upper in an area that requires more flex and stretch during use. Therefore, a shoe upper may include multiple tensile strands with varying degrees of stretch and flex. The stretch and flex of each tensile strand will depend on its location on a particular shoe upper.

FIG. 10 depicts an article of footwear comprising a shoe upper having a spacer textile material that includes multiple tensile strands. The disclosure is not limited to the particular pattern depicted in FIG. 10. Any of the various patterns, or any combination of patterns, described above may be incorporated into a similar article of footwear as well as possibly other articles and other kinds of apparel.

During activities that involve walking, running, or other ambulatory movements (e.g., cutting, braking), a foot within the shoes described above may tend to stretch the upper component of the shoe. That is, many of the material elements forming the upper (e.g., spacer textile material layers) may stretch when placed in tension by movements of the foot. Although the tensile strands or individual segments of the tensile strands may also stretch, the tensile strand generally stretches to a lesser degree than the other material elements forming the upper. The various segments of the tensile strands may be located, therefore, to form structural components in the upper that (a) resist stretching in specific directions or locations, (b) limit excess movement of the foot relative to the sole structure and the upper, (c) ensure that the foot remains properly positioned relative to the sole structure and the upper, and (d) reinforce locations where forces are concentrated.

In addition, the welds forming the channels of the spacer textile material may also form structural components in the upper. The welds, a fusion of the first layer to the second layer of the spacer textile material, may also assist the upper to (a) resist stretching in specific directions or locations, (b) limit excess movement of the foot relative to the sole structure and the upper, (c) ensure that the foot remains properly positioned relative to the sole structure and the upper, and (d) reinforce locations where forces are concentrated.

Based upon the above discussion, each of spacer textile material having tensile strands may have various configurations. Although each of these configurations are discussed separately, many of the concepts presented above may be combined to impart specific properties or otherwise ensure that spacer textile material having tensile strands are optimized for a particular purpose or product.

In still other embodiments, a spacer textile material including tensile strands arranged in various configurations may incorporated into various kinds of articles including, but are not limited to: hiking boots, soccer shoes, football shoes, sneakers, running shoes, cross-training shoes, rugby shoes, basketball shoes, baseball shoes as well as other kinds of shoes. Moreover, in some embodiments, a spacer textile material may be incorporated into various kinds of non-sports related footwear, including, but not limited to: slippers, sandals, high heeled footwear, loafers as well as any other kinds of footwear.

The spacer textile material could also be incorporated into various kinds of articles of apparel and/or sporting equipment (e.g., gloves, helmets, etc.). In some embodiments, the article may include one or more articulated portions that are configured to move. In other cases, the article may be configured to conform to portions of a wearer in a three-dimensional manner. Examples of articles that are configured to be worn include, but are not limited to: footwear, gloves, shirts, pants, socks, scarves, hats, jackets, as well as other articles. Other examples of articles include, but are not limited to: protective equipment such as shin guards, knee pads, elbow pads, shoulder pads, as well as any other type of protective equipment. Additionally, in some embodiments, the article could be another type of article including, but not limited to: bags, purses, backpacks, as well as other articles that may or may not be worn.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. A spacer textile material comprising: a first layer; a second layer; a plurality of connecting members extending between and joining the first layer and the second layer; a first channel bounded by portions of the first layer and the second layer that are in direct contact; a second channel bounded by portions of the first layer and the second layer that are in direct contact; a first tensile strand and a second tensile strand, wherein a first portion of the first tensile strand and a first portion of the second tensile strand are both disposed within the first channel; wherein a second portion of the first tensile strand and a second portion of the second tensile strand are both disposed within the second channel.

2. The spacer textile material according to claim 1, wherein first portion of the first tensile strand and the first portion of the second tensile strand are both disposed between the first layer and the second layer in the first channel.

3. The spacer textile material according to claim 1, wherein a third portion of the first tensile strand and a third portion of the second tensile strand extends between the first channel and the second channel along an edge of the spacer textile material.

4. The spacer textile material according to claim 3, wherein the third portion of the first tensile strand and the third portion of the second tensile strand form a loop between the first channel and the second channel.

5. The spacer textile material according to claim 1, wherein the first tensile strand and the second tensile strand move freely in a longitudinal direction of the first channel.

6. The spacer textile material according to claim 1, wherein the first channel and the second channel are configured in a non-linear pattern.

7. The spacer textile material according to claim 1, wherein the portions of the first layer and the second layer that are in direct contact are welds.

8. A spacer textile material comprising: a first layer; a second layer; a plurality of connecting members extending between and joining the first layer and the second layer; a first tensile strand and a second tensile strand; a first channel bounded by portions of the first layer and the second layer that are in direct contact; a second channel bounded by portions of the first layer and the second layer that are in direct contact; a third channel bounded by portions of the first layer and the second layer that are in direct contact; wherein a first portion of the first tensile strand and a first portion of the second tensile strand are both disposed within the first channel; wherein the first channel and the second channel are configured in a nonlinear pattern; wherein a second portion of the first tensile strand is disposed in the second channel; and wherein a second portion of the second tensile strand is disposed in the third channel.

9. The spacer textile material according to claim 8, wherein the portions of the first layer and the second layer that are in direct contact are welds.

10. The spacer textile material according to claim 9, wherein the second channel and the third channel share a common weld formed by the portions of the first layer and the second layer that are in direct contact.

11. The spacer textile material according claim 10, further comprising a fourth channel bounded by portions of the first layer and the second layer that are in direct contact; a third tensile strand; wherein a first portion of the third tensile strand is disposed in the first channel; and wherein a second portion of the thirst tensile strand is disposed in the fourth channel.

12. The spacer textile material according to claim 11, wherein the third channel and the fourth channel share a common weld formed by the portions of the first layer and the second layer that are in direct contact.

13. The spacer textile material according to claim 12, wherein the first portion of the first tensile strand, the first portion of the second tensile strand and the first portion of the third tensile strand are braided in the first channel.

14. The spacer textile material according to claim 13, wherein the braided tensile strands extend beyond an edge of the spacer textile material.

15. The spacer textile material according to claim 14, wherein a third portion of the first tensile strand separates from the braided tensile strands and the third portion of the first tensile strand extends between the braided tensile strands and the second channel along the edge of the spacer textile material.

16. The spacer textile material according to claim 15, wherein a third portion of the second tensile strand separates from the braided tensile strands and the third portion of the second tensile strand extends between the braided tensile strands and the third channel along the edge of the spacer textile material.

17. The spacer textile material according to claim 16, wherein a third portion of the third tensile strand separates from the braided tensile strands and the third portion of the third tensile strand extends between the braided tensile strands and the fourth channel along the edge of the spacer textile material.

18. An article of footwear comprising:
an upper and a sole structure;
wherein at least a portion of the upper comprises:
    a spacer textile material comprising:
        a first layer;
        a second layer;
        a plurality of connecting members extending between and joining the first layer and the second layer;
        a first tensile strand and a second tensile strand;
        a first channel bounded by portions of the first layer and the second layer that are in direct contact;
    wherein a first portion of the first tensile strand and a first portion of the second tensile strand are disposed in the first channel;
    wherein a second channel of the spacer textile material holds a third portion of the first tensile strand;
    wherein a third channel of the spacer textile material holds a third portion of the second tensile strand; and
    wherein the first channel, the second channel and the third channel are configured in a non-liner pattern.

19. The article of footwear according to claim 18, wherein the first channel, the second channel and the third channel extend from the sole structure of the article of footwear towards a lace of the upper.

20. The article of footwear according to claim 19, wherein a second portion of the first tensile strand forms a loop between the first channel and the second channel that is disposed outwardly from the first channel and wherein the lace of the article of footwear engages the second portion of the first tensile strand.

21. The article of footwear according to claim 20, wherein a second portion of the second tensile strand forms a loop between the first channel and the second channel that is disposed outwardly from the first channel and wherein the lace engages the second portion of the second tensile strand.

22. The article of footwear according to claim 21, wherein a first portion of a third tensile strand also extends through the first channel.

23. The article of footwear according to claim 18, wherein portions of the first layer and the second layer that are in direct contact are welds; and
    wherein the second channel and the third channel share a common weld.

* * * * *